United States Patent [19]

Chang

[11] 3,855,153

[45] Dec. 17, 1974

[54] UNSUPPORTED CATALYST FOR THE OXIDATION OF METHANOL TO FORMALDEHYDE

[75] Inventor: Gerald M. Chang, Orting, Wash.

[73] Assignee: Reichhold Chemicals, Inc., White Plains, N.Y.

[22] Filed: July 26, 1973

[21] Appl. No.: 383,037

[52] U.S. Cl.............................. 252/470, 260/606
[51] Int. Cl............................................ B01j 11/22
[58] Field of Search...................... 252/470; 260/606

[56] References Cited
UNITED STATES PATENTS

| | | |
|---|---|---|
| 2,849,492 | 8/1958 | Allyn et al. ........................ 252/470 |
| 3,198,753 | 8/1965 | Traina................................. 252/470 |
| 3,464,931 | 9/1969 | Aglietti et al. ..................... 252/470 |
| 3,781,350 | 12/1973 | Fujita et al.......................... 252/470 |

Primary Examiner—Arthur P. Demers

[57] ABSTRACT

This invention relates to an improved oxidation catalyst for the production of formaldehyde from methanol. Said improvement consists of finely grinding and balling an iron oxide-molybdenum oxide catalyst precursor into roughly spherical agglomerates while simultaneously applying an aqueous solution of ammonium hepta-molybdate and ammonium 6-molybdocobaltate (III) prior to dehydration and activation.

6 Claims, No Drawings

UNSUPPORTED CATALYST FOR THE OXIDATION OF METHANOL TO FORMALDEHYDE

This invention is directed to an improvement in the production of cobalt containing oxidation catalysts used for the conversion of methanol to formaldehyde and to the resulting product.

More particularly the method includes the following steps which are old in the prior art:

I. forming an iron oxide-molybdenum oxide catalyst precursor by reacting a water soluble iron salt having a pH of between 1.5 and 2.1 with a water soluble molybdate salt having a pH of between 2.25 and 5 to form a precipitate having a molar ratio of $MoO_3$ to $Fe_2O_3$ of from about 3.3:1 to 11.2:1 and II. recovering the precipitate and III. dehydrating the precipitate to a moisture content of from about 5 percent ot about 30 percent by weight, followed by IV. comminuting the precipitate and continued dehydrating to a moisture content of from about 2 percent to about 25 percent by weight, and V. activating the comminuted precipitate prior to contact with methanol by placing the precipitate in a formaldehyde converter or a suitable oven and passing a mild stream of air through the converter or an oven while the temperature is raised to from about 300° to about 495°C and maintained until substantially all traces of moisture and gasifiable matter are removed.

The improvement consists of the following steps:

A. prior to activating, the dehydrated comminuted precipitate is ground to particle size ranging from about 0.033 inches to about 0.007 inches and then B. balling the finely ground particles into spherical agglomerates while C. simultaneously applying to the spherical agglomerates, while they are forming, a mixture of ammonium heptamolybdate and a cobalt containing compound selected from the group consisting of metallic cobalt, cobalt oxide, cobalt salts and ammonium 6-molybdocobaltate $(III)_2$ so that the final balled catalyst precursor contains from 0.001 percent to about 0.20 percent cobalt by wieght, and from 0.01 percent to about 2 percent ammonium molybdate by weight, and D. dehydrating the spherical agglomerates to a moisture content of about 2 percent to about 10 percent by weight.

Still more specifically my method comprises the following steps in which are old in the prior art:

I. forming an iron oxide-molybdenum oxide catalyst precursor by reacting an aqueous solution of ferric chloride having a pH ranging between 1.5 to 2.1 with an aqueous solution of ammonium molybdate having a pH ranging between 2.25 and 5 to form a precipitate having a molar ration of $MoO_3$ to $Fe_2O_3$ of from about 3.3:1 to 11.2:1 and having a gravity between 2.1 and 4.3 and II. recovering the precipitate and III. dehydrating the precipitate to a moisture content of from about 2 percent to about 25 percent by weight, followed by IV. comminuting the precipitate and continued dehydrating to a moisture content of from about 2 percent to about 10 percent by weight, and V. activating the comminuted precipitate prior to contact with methanol by placing the precipitate in a formaldehyde converter or a suitable oven and passing a mild stream of air through the converter or an oven while the temperature is raised to from about 340° to 450°C and maintained until substantially all traces of moisture and gasifiable matter are removed.

The improvement consists of the following steps:

A. prior to activating, the dehydrated comminuted precipitate is ground to a particle size ranging from about 0.033 inches to about 0.007 inches and then B. balling the finely ground particles into spherical agglomerates having about a 4 × 8 mesh size while C. simultaneously applying to the spherical agglomerates, while they are forming, a mixture of ammonium heptamolybdate and a cobalt containing compound selected from the group consisting of metallic cobalt, cobalt oxide, cobalt salts, ammonium 5-molybdocabaltate (III), and ammonium 6-molybdocobaltate (III) so that the final balled catalyst contains from 0.013 percent to about 0.20 percent cobalt by weight, and from 0.01 percent to about 1.0 percent ammonium molybdate by weight, and D. dehydrating the spherical agglomerates to a moisture content of about 2 percent to about 10 percent by weight.

The production of iron oxide-molybdenum oxide catalysts for use in the manufacture of formaldehyde is well known in the art and many patents have been issued; such as, U.S. Pat. No. 1,913,405; 2,812,309; 3,152,997; 3,408,309; 3,420,783 and 3,716,497 which describe in detail their methods of preparation and use. While the standard unmodified iron-molybdate catalyst is very efficient, it nevertheless does have some drawbacks; such as, production of small quantities of carbon monoxide, dimethyl either and formic acid. Furthermore, these catalysts also require a long, slow conditioning period before full production rates are obtained. In order to overcome these deficiencies, modifications of the basic catalyst have been attempted. The purpose of these additives is to increase the yield of formaldehyde and to reduce undesirable side products; such as the formic acid and carbon monoxide. Compounds such as ammonium salts and cobalt compounds have been used and are also disclosed as for instance in U.S. Pat. No. 3,408,309 and 3,716,497 and British Pat. No. 909,376. These additional compounds are claimed to be added either by co-precipitating the compound during the formation of the iron oxide-molybdenum oxide catalyst precursor or by simply blending in the desired additive prior to compacting the precipitate into its desired physical shape. However, for those who are skilled in the art it is known that cobalt molybdate cannot be co-precipitated out by merely adding a cobalt salt and a molybdate together. This method of preparation will result in a catalyst containing only a trace amount of cobalt, if indeed any at all. Therefore, the introduction of any substantial amount of cobalt in the ion-molybdate catalyst would have to be by blending it into iron-molybdate precipitate by first synthesizing a cobalt bearing compound which is compatible with the iron-molybdate catalyst and then blending the two together. Furthermore, none of these additives has any effect on the long conditioning period prior to reaching full production.

Additionally, various physical shapes of the catalyst have also been tried but these too were not successful.

It is, therefore, an object of this invention to produce improved cobalt modified iron-molybdate catalysts useful for the oxidation of methanol to formaldehyde which greatly reduce the carbon monoxide, dimethyl ether and formic acid normally formed and which require a much shorter break-in period.

I have discovered a novel means of introducing cobalt into iron-molybdate catalysts whereby the performance of the iron-molybdate catalysts such as described in U.S. Pat. No. 1,913,405 and 2,812,309 is substantially improved. The improvement is accomplished with an overall concentration of cobalt in the range of 0.001 percent to 0.20 percent by weight of the catalyst precursor.

This has now been accomplished via the steps of finely grinding and balling the catalyst precursor into roughly spherical agglomerates while applying an uneven non-homogeneous coating of a cobalt containing compound and ammonium molybdate before final dehydration and activation. The form, an approximately spherical agglomerate, is unique as is the preparation whereby cobalt is applied to the surface of the catalyst particles rather than being intimately mixed or dispersed as in prior art.

Due to its shape, this catalyst has the advantages of lower pressure-drop during operation, resulting in less energy being used and a substantially reduced break-in period before full production rates are obtained. Due to the non-homogeneous character achieved by surface application of cobalt, the specificity and conversion efficiency is substantially improved over other oxidation catalysts. Due to the form and method of preparation, the catalyst will function for a longer period at the same rate and thus be more economical. Other advantages will be apparent from the disclosure.

As heretofore disclosed, it is known in the art that the addition of cobalt to iron-molybdate catalysts has a beneficial effect. In the British Pat. No. 908,376 it is disclosed that cobalt oxide, when intimately mixed into the iron-molybdate catalyst, improves the activity, selectivity, conversion efficiency and productivity of the corresponding binary molybdenum and iron catalysts. The patent limits the composition to 1.2 percent to 2.5 percent cobalt and states that if the catalyst contains less than 1.2 percent Co, the influence of the cobalt is nil and the activity of the ternary catalyst is equal to that of the corresponding binary molybdenum and iron catalysts. It is also stated that, on the other hand, if the catalyst contains more than 2.5 percent Co, the influence of cobalt becomes negative and the resulting catalysts give conversion of methanol to formaldehyde which are lower than those obtained with the binary molybdenum and iron catalyst. In all instances, they claim only the cobaltous compounds.

Thus, the advantages claimed in prior art references are achieved but at an overall concentration of cobalt that is much lower than heretofore thought possible. To be more specific, our method of introducing cobalt produces a non-homogeneous catalyst at a lower overall concentration of cobalt than previously known to have a beneficial effect. The primary difference in using cobaltic compounds such as ammonium 6-molybdocobaltate as compared to cobaltous compounds is that the formic acid formation is greatly reduced whereas the cobaltous compounds do not exhibit this effect.

To illustrate the high selectivity, high formaldehyde yield and low acidity of the conversion product obtainable with the catalyst according to the present invention, the following pilot plant data was obtained and presented in Table I.

TABLE I

| Catalyst Form | Cobalt cont. (wt. %) | Unreacted MeOH (mole %) | Carbon monoxide (mole %) | g formic acid/ g formaldehyde | Formaldehyde Yield % |
|---|---|---|---|---|---|
| granulars | 0 | 1.50 | 5.04 | 0.00035 | 91.68 |
| granulars | 0.780 (added as $CoMoO_4H_2O$) | 2.40 | 3.50 | 0.00094 | 92.62 |
| spheres | 0.022 | 1.57 | 3.72 | 0.00018 | 92.64 |
| spheres | 0.078 | 1.47 | 4.23 | 0.00008 | 92.70 |
| spheres | 0.130 | 1.51 | 3.77 | 0.00066 | 92.74 |

The pilot plant data were obtained under the conditions 7,300 $hr.^{-1}$ space velocity and a methanol concentration of 8 percent by volume in air. From Table I, it is apparent that the cobalt modified iron-molybdate catalyst of approximately sphere shapes gives less combustion product and formic acid resulting in much higher formaldehyde yield.

Another important feature of our invention is the physical form or shape of the catalyst. The known iron-molybdate catalysts are homogeneous and being non-supported catalysts are fragile and easily crushed or broken into smaller particles. This results in a loss of useable catalyst during handling. A further disadvantage is that the breaking into smaller particles during operation results in undesirable increase in pressure drop. Still another disadvantage is non-uniformity of tube loading because of its irregular shape, resulting in varying pressure drop from one tube to another in a multi-tube fixed bed reactor. This in turn results in varying rates of the reactant passing through the individual tubes. As a result, some tubes will over-oxidize the reactant and some under-oxidize; therefore, the conversion efficiency is less.

Many methods heretofore have been devised to overcome these disadvantages. For example, a precursor catalyst which contains more water and is easier to transport has been produced. The moist iron-molybdate precipitate has been kneaded or the semidry precipitate has been processed through rolls to increase the cohesion of the catalysts and render it less fragile. Other techniques, separately or combined with the above, are to form extrusions or tablets by the application of pressure to the moist, plastic iron-molybdate precipitate.

While these techniques do provide a less fragile catalyst and a more uniform physical form or shape, they introduce a severe deficiency in that a greater mass of catalyst must be used to provide sufficient contact time of the reactants and sufficient surface area. Thus, these techniques make a less economical catalyst form.

Another advantage with the iron-molybdate catalyst of approximately spherical shapes is it is more versatile than the other forms such as granular, pellets and tablets, in that it can readily be used in different size converter tubes. Because of its ease in handling, it can be used to load a converter of small diameter tubes much more readily than the other forms of the same size. In this respect, the granulars tend to bridge themselves inside the small converter tubes if catalyst size selection is incorrect and a nearly empty tube or tubes may result, thus adversely affecting the subsequent catalyst usage. Because of its intrinsic geometric character of the spheres, the iron-molybdate catalyst of approximately spherical shapes has much less chance of bridging inside the converter tubes and can be loaded into large as well as small tubes more uniformly and easily. Furthermore, because of the very slow back pressure rise and uniform loading of large as well as small tubes with the spherically shaped catalyst, it can be used to convert methanol to formaldehyde at a higher rate than the granulars. Normally, the methanol concentration in air is held around 7 percent by volume for the granulars at the early stage of the catalyst life. A rapid increase of methanol concentration usually results in rapid increase of back pressure. But a methanol concentration of 10 percent by volume in air may be used with the spherical catalyst without suffering higher back pressure rise. The spherical catalyst is more productive from the beginning.

In general, the catalyst life is dependent on the back pressure and the bath temperature rise with time. When either one of these two factors reaches the design maximum of the plant, the catalyst will have to be replaced. Therefore, if these two factors, back pressure and bath temperature, are low and rise slowly with time, the catalyst will have long catalyst life. The cobalt promoted iron molybdate catalyst, according to the present invention, have such characteristics of long catalyst life and differ appreciably from the known ones. To illustrate this point, the plant data are presented in FIG. 1 and 2. In FIG. 1, the back pressure measured in pounds per square inch gauge is plotted against the time as number of working days. In FIG. 2, the bath temperature required to maintain a specific conversion of reactants to product measured as degrees centigrade is plotted against time as number of working days. In both figures, the curve I relates to the catalyst according to the present invention and the curve II relates to a standard iron-molybdate catalyst.

Both plots are for the space velocity of 6,400 hr.$^{-1}$ and a methanol concentration of 9.5 volume percent in air. As is apparent from FIG. I and II, curve I is quite different from curve II. Curve I starts appreciably lower than curve II and has a much lesser declination and finally they run almost parallel to the abscissa. The advantages with the catalyst according to the present invention are accordingly evident in this respect.

Cobalt containing compounds suitable for use are selected from a group comprising metallic cobalt, cobalt oxide, ammonium 6-molybdocobaltate (III), ammonium 5-molybdocobaltate and the like. Various levels of cobalt content as analyzed on the finished catalyst precursor were tried ranging from 0.001 percent to about 1.2 percent by weight but it was found that a range of from about 0.013 percent to about 0.13 percent by weight yielded the best performance. This is the preferred range.

It was also found that in order to realize the maximum benefit from the coating of cobalt it was necessary to also apply a coating of ammonium heptamolybdate. The preferred amount of ammonium heptamolybdate is from 0.01 percent to about 1 percent by weight of the finished catalyst precursor.

Both the cobalt containing compound and the ammonium heptamolybdate may be applied in any convenient manner but it is preferrable to apply them both as aqueous solutions by simply spraying the agglomerates as they form in the balling pan. Both water and alcohols such as methanol, ethanol, butanol, propanol and isopropanol may be used as a carrier solution.

When the cobalt compound is applied as a solution, the solution may contain from about 0.113 percent to about 3.0 percent by weight and from about 0.02 percent to about 2 percent by weight of ammonium heptamolybdate in order to obtain the desired percentages of the compounds on the finished catalyst precursor.

In the case of powder coating, finely divided cobalt metal, cobalt oxide or other cobalt-containing compounds can be pneumatically deposited on wet or damp catalyst particles and the amount of air loading would determine the amount of cobalt applied to the surface.

To produce the cobalt modified iron-molybdate catalyst of approximately spherical shapes, the iron-molybdate precipitate is first obtained, filtered of water in a suitable way and washed and dried in an oven following the method outlined in U.S. Pat. No. 2,812,309. A typical example of producing the catalyst is as follows: The dry iron molybdate filter cake is subject to a careful grinding to obtain fines of mostly 0.033 to 0.007 inches grain sizes, but it may contain some finer sizes. The choice of grain size and size distribution is dependent on the ease of balling and the size yield and the bulk density of the spherical catalyst desired. Normally, the fine grains are easier to roll and thus higher size yield and high bulk density result. The fines are constantly fed to an inclined rotating pan where a cobalt salt solution of predetermined concentration is applied to the rolling fines and spherical agglomerates. The pan is fitted with plows to scrape fines off the bottom and edges. The wet agglomerates, about 38 percent – 60 percent moisture, roll off the pan continuously and are dried in an oven to a moisture content ranging from about 2 percent to about 10 percent by weight after 2 days of air drying at room temperature. The dried spherical agglomerates are then screened to the desired sizes, preferably ranging from about 4 to 8 mesh, for use. The over and under size agglomerates are reground and blended with fresh fines for reballing.

The drying of the agglomerated catalyst should be gradual; first air dry at room temperature to prevent the mutual adhesion of the agglomerates, then oven dry at increasing temperature up to 105°C with air circulation so that the gradual contraction of the agglomerates is effected without promoting crumbling and cracking. The total oven drying time is about 7 days.

The activation of the agglomerated catalyst is similar to the drying process in its graduation of temperature rise. One of the typical ways of activation is to gradually increase the catalyst temperature from 60° to 350°–450°C while a small stream of air is passed through the catalyst bed. Normally, the catalyst bed is first held at 360° to 380°C for 2 hours before heated up to 410° to 450°C. The catalyst is held at 350° to 450°C for 3 hours before cooling down to around 250°C for use. It usually takes about 32 hours for the activation of the agglomerated catalyst.

The activation of the agglomerated catalyst can be carried out either inside or outside of a converter depending on the availability of equipment. However, from the standpoints of product uniformity, user's convenience and ease of handling, it is preferred to activate the agglomerated catalyst outside of a methanol converter. This way the catalyst non-uniformity caused by the variation in user's equipment and personnel can be avoided. Additionally the activated catalyst has acquired improved mechanical strength which enables the catalyst to be handled and transported without crumbling or the formation of powder and is ready to produce.

Preparation of iron oxide-molybdenum oxide catalyst precursor according to U.S. Pat. No. 2,812,309.

The following experiment was conducted in a glass-lined reactor as follows:

EXAMPLE I 1. 39.7 pounds of technical grade molybdenum trioxide (90% $MoO_3$) were added to 1,030 pounds of a 2.9 percent aqueous solution of sodium hydroxide with rapid stirring to dissolve all the $MoO_3$. The temperature of the solution increased to about 140–160°F during the addition of the molybdenum trioxide to the caustic solution.

2. The resulting sodium molybdate solution was filtered while hot to remove the undissolved material. The remaining solids (essentially silicon dioxide and ferric hydroxide) were discarded.

3. Sufficient concentrated reagent grade HCl (12 normal) was added to bring the pH of the sodium molybdate solution down to 2.0. This solution was labeled Solution A.

4. 20.0 pounds of reagent grade ferric chloride ($FeCl_3.6H_2O$) were dissolved in 1,000 pounds of water and labeled Solution B. The pH of this solution was measured and found to be 1.7.

5. Solution A was added to Solution B with rapid stirring.

6. The precipitate was allowed to settle, then the supernatant liquid siphoned off.

7. The precipitate was washed with 1,000 pounds of cold water.

8. The precipitate was again allowed to settle and then the wash water was siphoned off.

9. The precipitate was then run to the filter and as much water as possible was removed by vacuum filtration. Filter cakes were allowed to build up to 1.5 inches in thickness—a satisfactory thickness for further drying—before removal from the filter.

10. Upon removal from the filter, the cakes were placed on ventilated racks and air dried for 5 days at room temperature.

11. Further drying consisted of the following:
   a. 48 hours at 175°F.
   b. 72 hours at 225°F.
   c. Filter cakes turned over and broken up into chunks 1 mesh or less in size, then dried for 24 hours at 300°F.

12. This dried precipitate—having a moisture content of about 13.4 percent and containing about 15.5% $Fe_2O_3$—was comminuted to −6+10 mesh to yield about 20 pounds of catalyst precursor.

EXAMPLE II

An iron oxide-molybdenum oxide catalyst precursor was prepared in glass lined and porcelain equipment as follows:

1. 25 pounds 2 ounces of C. P. grade ferric chloride ($FeCl_3.6H_2O$) were dissolved in 150 gallons of water initially at 70°F. The pH of the resulting solution was about 1.7.

2. In a separate vessel 56 pounds 6 ounces of C. P. grade ammonium heptamolybdate[$(NH_4)_6Mo_7O_{24}.4H_2O$] were dissolved in 100 gallons of water initially at 125°F. The pH of the resulting solution was approximately 5.3. This pH was adjusted to 2.25 using about 12 pounds of C. P. hydrochloric acid (12 normal).

3. The ammonium molybdate solution was then added slowly with efficient rapid agitation to the ferric chloride solution, the total elapsed time being about 1 hour.

4. The resulting greenish yellow precipitate was allowed to settle about 6 hours and the supernatant liquid siphoned off. The settled precipitate was then washed with cold water in two separate portions of about 20 gallons apiece, the precipitate being allowed to settle 4 hours after each wash before siphoning off the wash water.

5. The resulting slurry was then vacuum filtered to a cake thickness of 1.5 inches.

6. The cakes were then dried according to the procedure of Example I, steps 10 and 11.

7. The dried catalyst precursor was then comminuted to −8, +20 mesh.

Preparation of improved cobalt modified iron oxide-molybdenum oxide catalyst.

EXAMPLE III

The dried iron-molybdate precipitate from Example II was ground through hammermill until the size of the particles ranged from about 0.007 inches to about 0.033 inches. These were next passed through a balling pan to form spherical agglomerates having a 4 × 8 mesh size. The balling pan was 39 inches in diameter and made of stainless steel with a pan depth of 4 inches and a pan angle of 59° and fitted with three plows to scrape the fines off the bottom and edges of the pan. A pan speed of 20 RPM was used for balling the fines.

The ground fines were fed to the rotating pan while an aqueous solution containing 1 percent by weight ammonium 6-molybdocobaltate (III) and 0.026 percent by weight ammonium heptamolybdate was sprayed into the pan. The finished balls had about 47 percent moisture by weight. Next they were air dried for two days and then oven dried at increasing temperatures up to 105°C with air circulation to a final moisture content of 6.8 percent by weight. Total drying time was 7 days. The finished catalyst precursor was then ready to be activated in a formaldehyde converter or otherwise.

EXAMPLE IV

Following Example III, additional balled catalyst precursors were prepared having different amounts of ammonium 6-molybdocobaltate (III) applied. The same amount (0.026 percent by weight) aqueous solution of the ammonium heptamolybdate was used. Instead of the molybdate, ammonium paratungstate may be used.

Four levels of concentration of the spray solution used were as follows:

TABLE I

Ammonium 6-molybdocobaltate Concentration in Spray Solution
vs.
Cobalt Content in the Ball Catalyst

| Spray Concentration (Wt. %) | Cobalt Content (Wt. %) Calculated | Analyzed |
| --- | --- | --- |
| 0.113 | 0.005 | 0.013 |
| 0.513 | 0.022 | 0.018 |
| 1.790 | 0.078 | 0.043 |
| 3.000 | 0.130 | 0.073 |

The difference between the calculated cobalt content in the catalyst and analyzed value is due to uneven coating or heterogeneous nature of cobalt coverage.

These catalyst precursors were then loaded into a pilot plant formaldehyde converter, activated and then used to oxide methanol to formaldehyde. Catalyst beds were 23 inches deep and activated at 380° to 445°C. A 0.80 SCFM air flow per tube and a methanol ratio of about 8 were always used. Table II summarizes the data obtained from the tests.

The distinct advantages of instant invention can be seen quite readily by comparing the different runs. Run 5 is the standard iron oxide-molybdenum oxide catalyst from Example I which is quite widely used throughout the world for formaldehyde production from methanol. Compare its performance with Run 6 which is the standard catalyst from Example I which has been finely ground and balled but which has not had the surface treatment of this invention. Run 6 has much lower back pressure rise and good catalyst activity which is evidenced by the fact that the reactor bath temperature did not have to continually be adjusted to obtain a high conversion rate. However, the formic acid formation was higher while the formaldehyde yield remained about the same. Run 3 is the preferred balled catalyst. By comparing Runs 3 and 5, it can be seen that Run 3 has extremely low back pressure, significantly less CO product, as well as less dimethylether. The amount of formic acid is less than ¼ that produced in Run 5. Furthermore, the yield of formaldehyde is increased from 91.33 percent for Run 5 to 92.70 percent for Run 3.

Run 7 is the standard granular catalyst blended with cobalt molybdate which was made according to the teachings of British Pat. No. 909,376. In Run 7, the formaldehyde yield is acceptable. However, in comparing Run 7 to Run 3 which is the preferred catalyst, the great difference lies in that with the non-homogeneous cobalt coating, which is essentially all in cobaltic form (in the ter-valent state as compared to the British which is in cobaltous form or in bi-valent state) a ten-fold reduction in formic acid formation can be realized, 0.00008 versus 0.00094 grams formic acid per gram formaldehyde. The cobaltous ion may be oxidized thermally in the presence of air to its highest oxidation state, the ter-valent state during the catalyst calcination step, but it requires temperature much higher than 450°C and the excessively higher temperature will reduce the catalyst activity and thus it is not practical to do so.

Therefore, it can be readily concluded that the presence of cobaltic ion in the catalyst is responsible for formic acid reduction as well as increased formaldehyde yield.

TABLE II

EFFECTS OF Co CONTENT ON THE CATALYST ACTIVITY AND SELECTIVITY

| Run | Co Content (Wt. %) | Activation Temp. (°C) | T hot (°C) | R (I) | Bath Temp. (°C)(II) ti | tm | tf | Back Press ΔP (in Hg) | MeOH Leakage (Mole %) | CO (Mole %) | DME (Mole %) | g HCOOH/ g CH₂O | CH₂O Yield (%) |
| --- | --- | --- | --- | --- | --- | --- | --- | --- | --- | --- | --- | --- | --- |
| 1 | 0.005 | 380 | 389 | 7.95 | 244 | | | 1.9 | 1.80 | 5.17 | 1.70 | 0.00053 | 91.33 |
| | | 445 | 391 | 8.67 | 248 | | | 1.8 | 2.70 | 5.50 | 1.68 | 0.00009 | 90.12 |
| 2 | 0.022 | 390 | 385 | 7.0 | 234 | 234 | 237 | 2.4 | 1.56 | 4.74 | 2.23 | 0.00073 | 91.47 |
| | | 431 | 365 | 7.3 | 240 | 236 | | 2.1 | 1.57 | 3.72 | 2.07 | 0.00018 | 92.64 |
| 3 | 0.078 | 380 | 385 | 7.8 | 232 | 238 | 240 | 2.4 | 1.74 | 4.73 | 1.62 | 0.00069 | 91.91 |
| | | 436 | 374 | 8 | 233 | 233 | | 2.0 | 1.47 | 4.23 | 1.63 | 0.00008 | 92.70 |
| 4 | 0.130 | 424 | 390 | 7.8 | 233 | 234 | | 2.3 | 151 | 3.77 | 1.96 | 0.00066 | 92.74 |
| 5 | Regular Granular Catalyst (Control) | 388 | 374 | 7.5 | 230 | 234 | | 3.3 | 1.90 | 5.15 | 1.63 | 0.00066 | 91.33 |
| | | 439 | 386 | 7.5 | 228 | 231 | | 2.4 | 1.50 | 5.04 | 1.77 | 0.00035 | 91.69 |
| 6 | Balled but no surface treatment | 380 | | 7.5 | 236 | 236 | | 2.9 | 1.62 | 4.99 | 1.87 | 0.00075 | 91.50 |
| 7 | Regular granular catalyst blended with CoMoO₄·H₂O Co = 1.09% | 390 | 374 | 6.7 | 244 | 250 | | 2.6 | 2.09 | 4.63 | 1.14 | 0.00094 | 92.55 |
| | | 437 | 382 | 8.2 | 248 | 252 | | 2.1 | 2.40 | 3.49 | 1.48 | 0.00094 | 92.62 |

(I) R = Mole MeOH/Mole Air × 100 Mole ratio of methanol to air
(II) ti = start up bath temp. tm = bath temp. after running 3 days tf = bath temp. after 2 weeks

EXAMPLE V

In order to prove the superior performance of the improved catalyst over the known catalyst, a commercial formaldehye converter was charged with fresh iron oxide-molybdenum oxide catalyst produced and activated according to the teachings of U.S. Pat. No. 2,812,309. The unit ran for 301 days before being shut down. Next, the same converter was charged with catalyst prepared according to Example III but containing 0.020 percent cobalt. The unit was run for 247 days before being shut down. Comparative data is shown below.

| Length of run (days) | Catalyst shape | Lb. CH₂O/ lb. catalyst | ΔP(p.s.i.g.) Start and end | ΔP(p.s.i.g.) Avg. | Unit power, kw. hr./ lb. CH₂O | Avg. rate, lb. H+/lb. CH₂O | Mole ratio— Methanol Start | Mole ratio— Methanol Peak | Mole ratio— Methanol Avg. | Average yield Lb. CH₂O/ gal. | Average yield Per- cent | Activa- tion temp. (°C.) | Time to reach peak production (days) |
| --- | --- | --- | --- | --- | --- | --- | --- | --- | --- | --- | --- | --- | --- |
| 301 | Granular | 13,306 | 4.75 8.75 | 7.0 | 0.0189 | 0.000346 | 6 | 10.3 | 9.0 | 15.13 | 90.05 | 365 | 36 |
| 247 | Spherical ag- glomerate with 0.020% Co coated. | 11,670 | 4.25 8.00 | 5.3 | 0.0170 | 0.000336 | 6 | 10.3 | 9.5 | 15.40 | 91.66 | 430 | 10 |

As heretofore demonstrated in the pilot plant (TABLE II) the improved catalyst shows lower pressure increase 5.3 (PSIG) vs. 7.0 (PSIG), improved yield 91.66 percent vs. 90.05 percent and lower formic acid production 0.000336 vs. 0.000346 lbs/lb formaldehyde. Additionally, the kilowatt-hour/lb. of formaldehyde was only 0.0170 for the improved catalyst vs. 0.0189 for the standard catalyst. Furthermore, the improved catalyst reached peak production in only 10 days whereas 36 days were needed for the standard catalyst.

Therefore, based upon these results, it is found that the improved cobalt modified iron oxide-molybdenum catalyst in spherical agglomerate form of this invention are indeed more efficient catalysts for the production of formaldehyde and they use less electrical energy, due to the low back pressure, thereby showing a reduced power cost/lb. of formaldehyde produced.

What is claimed is:

1. In a method for producing an oxidation catalyst for the production of formaldehyde from methanol comprising:
   I. forming an iron oxide-molybdenum oxide catalyst precursor by reacting a water soluble iron salt having a pH of between 1.5 and 2.1 with water soluble molybdate salt having a pH of between 2.25 and 5 to form a precipitate having a molar ratio of $MoO_3$ to $Fe_2O_3$ of from about 3.3:1 to 11.2:1 and
   II. recovering the precipitate and
   III. dehydrating the precipitate to a moisture content of from about 5 percent to about 30 percent by weight, followed by
   IV. comminuting the precipitate and continued dehydrating to a moisture content of from about 2 percent to about 25 percent by weight, and
   V. activating the comminuted precipitate prior to contact with methanol by placing the precipitate in a formaldehyde converter or a suitable oven and passing a mild stream of air through the converter or an oven while the temperature is raised to from about 300° to about 495°C and maintained until substantially all traces of moisture and gasifiable matter are removed; the improvement consisting of the following steps: (A) prior to activating, the dehydrated comminuted precipitate is ground to particle size ranging from about 0.033 inches to about 0.007 inches and then (B) balling the finely ground particles into spherical agglomerates while (C) simultaneously applying to the spherical agglomerates while they are forming a mixture of ammonium heptamolybdate and a cobalt containing compound selected from the group consisting of metallic cobalt, cobalt oxide, cobalt salts and ammonium 6-molybdocobaltate (III) so that the final balled catalyst precursor contains from 0.001 percent to about 0.20 percent cobalt by weight, and from 0.01 percent to about 2 percent ammonium molybdate by weight, and (D) dehydrating the spherical agglomerates to a moisture content of about 2 percent to about 10 percent by weight.

2. In a method for producing an oxidation catalyst for the production of formaldehyde from methanol comprising:
   I. forming an iron oxide-molybdenum oxide catalyst precursor by reacting an aqueous solution of ferric chloride having a pH ranging between 1.5 and 2.1 with an aqueous solution of ammonium molybdate having a pH ranging between 2.25 and 5 to form a precipitate having a molar ratio of $MoO_3$ to $Fe_2O_3$ of from about 3.3:1 to 11.2:1 and having a specific gravity between 2.1 and 4.3 and
   II. recovering the precipitate and
   III. dehydrating the precipitate to a moisture content of from about 2 percent to about 25 percent by weight, followed by
   IV. comminuting the precipitate and continued dehydrating to a moisture content of from about 2 percent to about 10 percent by weight, and
   V. activating the comminuted precipitate prior to contact with methanol by placing the precipitate in a formaldehyde converter or a suitable oven and passing a mild stream of air through the converter or an oven while the temperature is raised to from about 340° to 450°C and maintained until substantially all traces of moisture and gasifiable matter are removed; the improvement consisting of the following steps: (A) prior to activating, the dehydrated comminuted precipitate is ground to a particle size ranging from about 0.033 inches to about 0.007 inches and then (B) balling the finely ground particles into spherical agglomerates having about a 4 × 8 mesh size while (C) simultaneously applying to the spherical agglomerates while they are forming a mixture of ammonium heptamolybdate and cobalt containing compound selected from the group consisting of metallic cobalt, cobalt oxide, cobalt salts, ammonium 5-molybdocobaltate (III), and ammonium 6-molybdocobaltate (III) so that the final balled catalyst contains from 0.013 percent to about 0.20 percent by weight, and from 0.01 percent to about 1.0 percent ammonium molybdate by weight, and (D) dehydrating the spherical agglomerates to a moisture content of about 2 percent to about 10 percent by weight.

3. The improvement according to claim 2 wherein the cobalt containing compound is selected from the group consisting of ammonium 6-molybdocobaltate (III) and ammonium 5-molybdocobaltate (III).

4. The oxidation catalyst for the production of formaldehyde from methanol according to claim 1.

5. The oxidation catalyst for the production of formaldehyde from methanol according to claim 2.

6. The cobalt-modified iron-molybdenum catalyst produced in accordance with claim 1, having a cobalt content within the range from about 0.001 percent to 0.20 percent by weight of the final balled catalyst precursor.

* * * * *

UNITED STATES PATENT OFFICE
CERTIFICATE OF CORRECTION

Patent No. 3,855,153  Dated December 17, 1974

Inventor(s) Gerald M. Chang

It is certified that error appears in the above-identified patent and that said Letters Patent are hereby corrected as shown below:

The drawing should appear as shown on the attached sheet.

$\mathfrak{S}$igned and $\mathfrak{S}$ealed this fourteenth Day of October 1975

[SEAL]

Attest:

RUTH C. MASON
*Attesting Officer*

C. MARSHALL DANN
*Commissioner of Patents and Trademarks*

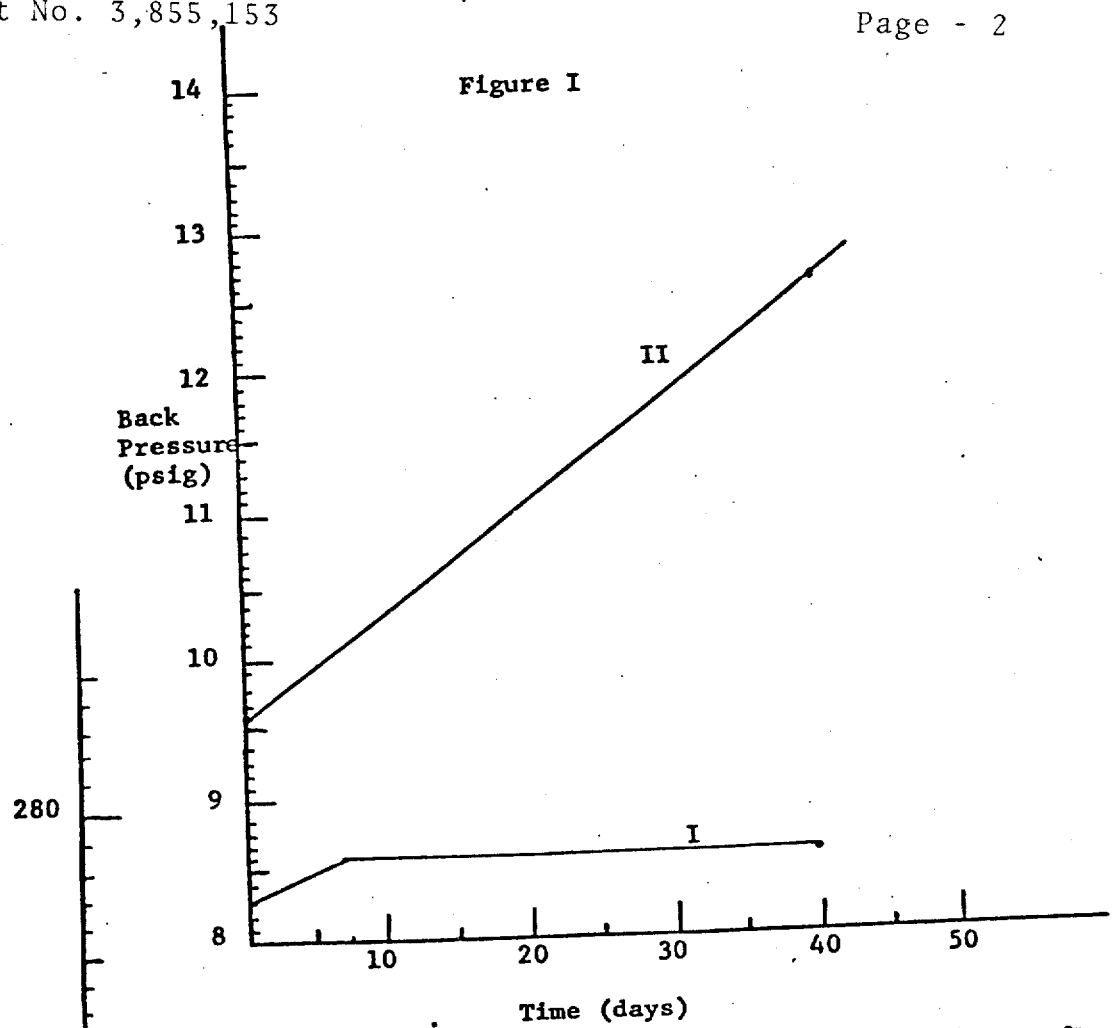
Figure I
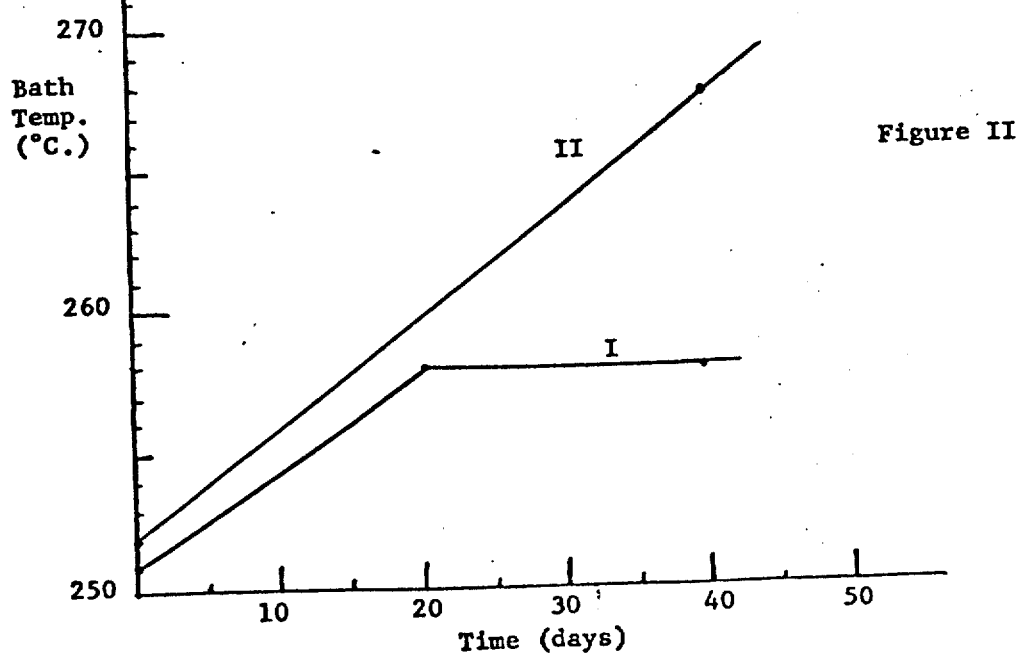
Figure II